United States Patent
Takahagi et al.

(10) Patent No.: US 10,020,471 B2
(45) Date of Patent: Jul. 10, 2018

(54) BATTERY PACKAGING MATERIAL

(71) Applicant: DAI NIPPON PRINTING CO., LTD., Tokyo (JP)

(72) Inventors: Atsuko Takahagi, Tokyo (JP); Rikiya Yamashita, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 178 days.

(21) Appl. No.: 15/118,994

(22) PCT Filed: Feb. 18, 2015

(86) PCT No.: PCT/JP2015/054384
§ 371 (c)(1),
(2) Date: Aug. 15, 2016

(87) PCT Pub. No.: WO2015/125806
PCT Pub. Date: Aug. 27, 2015

(65) Prior Publication Data
US 2016/0365545 A1 Dec. 15, 2016

(30) Foreign Application Priority Data
Feb. 18, 2014 (JP) ................. 2014-028503

(51) Int. Cl.
*H01M 2/02* (2006.01)
*B32B 15/08* (2006.01)
(Continued)

(52) U.S. Cl.
CPC ............ *H01M 2/0287* (2013.01); *B32B 7/12* (2013.01); *B32B 15/08* (2013.01); *B32B 15/20* (2013.01);
(Continued)

(58) Field of Classification Search
CPC ....................................................... H01M 2/02
See application file for complete search history.

(56) References Cited

U.S. PATENT DOCUMENTS

2013/0149597 A1 6/2013 Suzuta et al.

FOREIGN PATENT DOCUMENTS

| JP | 2008-287971 A | 11/2008 |
| JP | 2011-076735 A | 4/2011 |

(Continued)

OTHER PUBLICATIONS

May 19, 2015 International Search Report issued in International Patent Application No. PCT/JP2015/054384.

(Continued)

*Primary Examiner* — Jacob Marks
(74) *Attorney, Agent, or Firm* — Oliff PLC

(57) ABSTRACT

Provided is a battery packaging material comprising a film-like layered body obtained by sequentially layering at least a substrate layer, an adhesive layer, a metal layer and a sealant layer, the battery packaging material exhibiting excellent moldability and being unlikely to crack or form a pinhole during the molding thereof. A battery packaging material comprising a layered body obtained by sequentially layering at least a substrate layer, an adhesive layer, a metal layer and a sealant layer, wherein the substrate layer is configured in a manner such that the sum (A+B) of a value (A) equal to stress when stretching to 50% in the MD direction/stress when stretching to 5% and a value (B) equal to stress when stretching to 50% in the TD direction/stress when stretching to 5% satisfies the relationship A+B≥3.5.

10 Claims, 1 Drawing Sheet

(51) Int. Cl.
*H01G 9/08* (2006.01)
*H01G 11/78* (2013.01)
*B32B 7/12* (2006.01)
*B32B 27/34* (2006.01)
*B32B 27/36* (2006.01)
*B32B 15/20* (2006.01)
*H01G 9/004* (2006.01)

(52) U.S. Cl.
CPC .............. *B32B 27/34* (2013.01); *B32B 27/36* (2013.01); *H01G 9/004* (2013.01); *H01G 9/08* (2013.01); *H01G 11/78* (2013.01); *B32B 2439/00* (2013.01); *B32B 2457/10* (2013.01); *Y02E 60/13* (2013.01)

(56) References Cited

FOREIGN PATENT DOCUMENTS

JP  2014-002902 A  1/2014
WO  2012/033133 A1  3/2012

OTHER PUBLICATIONS

Akira Ota. "Press Processing Technical Manual". Nikkan Kogyo Shimbun, Ltd., Jul. 30, 1981, pp. 1-3.

BATTERY PACKAGING MATERIAL

TECHNICAL FIELD

The present invention relates to a battery packaging material having excellent moldability with pinholes and cracks hardly generated during molding.

BACKGROUND ART

Various types of batteries have been developed heretofore, and in every battery, a packaging material is an essential member for sealing battery elements such as an electrode and an electrolyte. Metallic packaging materials have been often used heretofore for battery packaging.

On the other hand, in recent years, batteries have been required to be diversified in shape and to be thinned and lightened with improvement of performance of electric cars, hybrid electric cars, personal computers, cameras, mobile phones and so on. However, metallic battery packaging materials that have often been heretofore used have the disadvantage that it is difficult to keep up with diversification in shape, and there is a limit on weight reduction.

Thus, in recent years, there has been proposed a film-shaped laminate with a base material, a metal layer and a sealant layer laminated in this order has been proposed as a battery packaging material which is easily processed into diversified shapes and is capable of achieving thickness reduction and weight reduction. However, such a film-shaped packaging material is thinner as compared to a metallic packaging material, and has the disadvantage that pinholes and cracks are easily generated during molding. If pinholes and cracks are generated in a battery packaging material, an electrolytic solution may permeate to a metal layer to form a metal precipitate, resulting in generation of a short-circuit, and therefore it is absolutely necessary that a film-shaped battery packaging material have a property that makes it hard to generate pinholes during molding, i.e. excellent moldability.

Various studies have been conducted heretofore with attention paid to an adhesive layer for bonding a metal layer in order to improve the moldability of a film-shaped battery packaging material. For example, Patent Document 1 discloses that in a laminated packaging material which includes an inner layer including a resin film; a first adhesive agent layer; a metal layer; a second adhesive agent layer; and an outer layer including a resin film, at least one of the first adhesive agent layer and the second adhesive agent layer is formed of an adhesive agent composition containing a resin having an active hydrogen group on the side chain, a polyfunctional isocyanate and a polyfunctional amine compound to give a packaging material having high reliability in deeper molding.

As represented by Patent Document 1, many studies have been conducted heretofore on techniques for improving moldability with attention paid to blended components of an adhesive layer for bonding a metal layer and other layer in a battery packaging material including a film-shaped laminate, but there have been reported very few techniques for improving moldability with attention paid to the properties of an outer layer.

PRIOR ART DOCUMENTS

Patent Document

Patent Document 1: Japanese Patent Laid-open Publication No. 2008-287971

Non-Patent Document

Non-Patent Document 1: Tetsu Ota, "Press Processing Technical Manual," published by THE NIKKAN KOGYO SHIMBUN, LTD., issued on Jul. 30, 1981, pages 1 to 3

SUMMARY OF THE INVENTION

Problems to be Solved by the Invention

A main object of the present invention is to provide the following technique: a battery packaging material including a film-shaped laminate in which at least a base material layer, an adhesive layer, a metal layer and a sealant layer are laminated in this order has excellent moldability with cracks and pinholes hardly generated during molding.

Means for Solving the Problems

The present inventors have extensively conducted studies for achieving the above-mentioned object. Resultantly, the present inventors have found that when in a resin film that forms an outer layer (base material layer), the lower limit of a sum (A+B) of a ratio A of a stress in elongation by 50% to a stress in elongation by 5% in the flow direction (MD direction) and a ratio B of a stress in elongation by 50% to a stress in elongation by 5% in the vertical direction (TD direction) that is coplanar with the flow direction (MD direction) is set to a specific value, unexpectedly outstandingly excellent moldability can be imparted to a battery packaging material, so that the ratio of generation of pinholes and cracks during molding can be considerably reduced. The present invention has been completed by further conducting studies based on the above-mentioned findings.

That is, the present invention provides a battery packaging material and a battery of the following aspects.

Item 1. A battery packaging material including a laminate in which at least a base material layer, an adhesive layer, a metal layer and a sealant layer are laminated in this order, the base material layer satisfying the relationship of $A+B \geq 3.5$, where A+B is a sum of a value A of a ratio of a stress in elongation by 50% in the MD direction to a stress in elongation by 5% in the MD direction and a value B of a ratio of a stress in elongation by 50% in the TD direction to a stress in elongation by 5% in the TD direction.

Item 2. The battery packaging material according to item 1, wherein the value A and the value B satisfy the relationship of $A<B$.

Item 3. The battery packaging material according to item 1 or 2, wherein the value A is 1.5 or more, and the value B is 2.0 or more.

Item 4. The battery packaging material according to any one of items 1 to 3, wherein the base material layer is formed of at least one of a polyamide resin and a polyester resin.

Item 5. The battery packaging material according to any one of items 1 to 4, wherein at least one surface of the metal layer is subjected to a chemical conversion treatment.

Item 6. The battery packaging material according to any one of items 1 to 5, wherein the metal layer is formed of an aluminum foil.

Item 7. The battery packaging material according to any one of items 1 to 6, which is a packaging material for a secondary battery.

Item 8. A battery, wherein a battery element including at least a positive electrode, a negative electrode and an electrolyte is stored in the battery packaging material according to any one of items 1 to 7.

Item 9. Use, as a battery packaging material, of a laminate in which at least a base material layer, an adhesive layer, a metal layer and a sealant layer are laminated in this order, the base material layer satisfying the relationship of A+B≥3.5, where A+B is a sum of a value A of a ratio of a stress in elongation by 50% in the MD direction to a stress in elongation by 5% in the MD direction and a value B of a ratio of a stress in elongation by 50% in the TD direction to a stress in elongation by 5% in the TD direction.

Item 10. A method for producing a battery, the method including the step of: storing in a battery packaging material a battery element including at least a positive electrode, a negative electrode and an electrolyte, the battery packaging material including a laminate in which at least a base material layer, an adhesive layer, a metal layer and a sealant layer are laminated in this order, the base material layer satisfying the relationship of A+B≥3.5, where A+B is a sum of a value A of a ratio of a stress in elongation by 50% in the MD direction to a stress in elongation by 5% in the MD direction and a value B of a ratio of a stress in elongation by 50% in the TD direction to a stress in elongation by 5% in the TD direction.

Advantages of the Invention

In a battery packaging material according to the present invention, a metal layer can properly follow the shape of a mold during molding, so that generation of pinholes, cracks and the like can be suppressed. The battery packaging material according to the present invention has excellent moldability as described above, and therefore can contribute to improvement of productivity.

EMBODIMENTS OF THE INVENTION

A battery packaging material according to the present invention includes a laminate in which at least a base material layer, an adhesive layer, a metal layer and a sealant layer are laminated in this order, the base material layer satisfying the relationship of A+B≥3.5, where A+B is a sum of a value A of a ratio of a stress in elongation by 50% in the MD direction to a stress in elongation by 5% in the MD direction and a value B of a ratio of a stress in elongation by 50% in the TD direction to a stress in elongation by 5% in the TD direction. Hereinafter, the battery packaging material according to the present invention will be described in detail.

1. Laminated Structure of Battery Packaging Material

Figure 1:
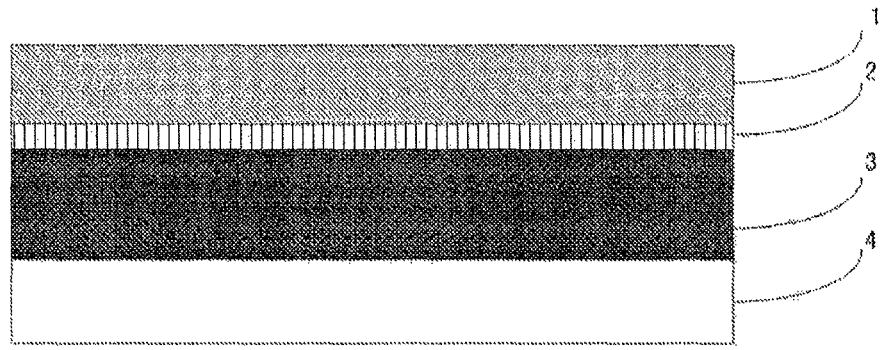
FIG. 1 is a drawing showing one example of a cross-sectional structure of a battery packaging material according to the present invention.

The battery packaging material includes a laminate in which at least a base material layer 1, an adhesive layer 2, a metal layer 3 and a sealant layer 4 are laminated in this order as shown in FIG. 1. In the battery packaging material according to the present invention, the base material layer 1 is an outermost layer, and the sealant layer 4 is an innermost layer. That is, at the time of assembling a battery, the sealant layer 4 situated on the periphery of a battery element is heat-welded with itself to hermetically seal the battery element, so that the battery element is encapsulated.

Figure 2:
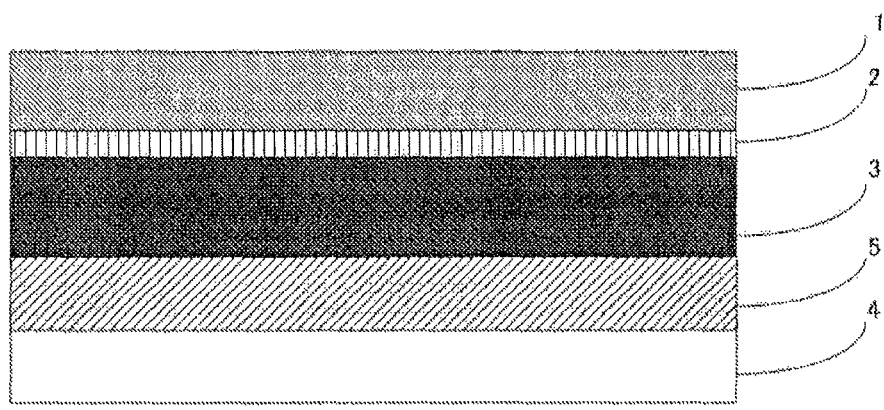
FIG. 2 is a drawing showing one example of a cross-sectional structure of a battery packaging material according to the present invention.

As shown in FIG. 2, the battery packaging material according to the present invention may be provided with an adhesive layer 5 between the metal layer 3 and the sealant layer 4 as necessary in order to improve adhesiveness of these layers.

2. Composition of Each Layer Forming Battery Packaging Material

[Base Material Layer 1]

In the battery packaging material according to the present invention, the base material layer 1 is a layer that forms the outermost layer. In the present invention, the base material layer 1 satisfies the relationship of A+B≥3.5, where A+B is a sum of a value A of a ratio of a stress in elongation by 50% to a stress in elongation by 5% in the MD direction and a value B of a ratio of a stress in elongation by 50% to a stress in elongation by 5% in the TD direction. Specifically, in a resin film that forms the base material layer 1, the sum (A+B) of the value A of a ratio of a stress in elongation by 50% to a stress in elongation by 5% in the MD direction and the value B of a ratio of a stress in elongation by 50% to a stress in elongation by 5% in the vertical direction (TD direction) that is coplanar with the MD direction satisfies the relationship of A+B≥3.5. In the present invention, the stress in elongation by 50% and the stress in elongation by 5% in each of the MD direction and the TD direction in the base material layer 1 are each a value measured in accordance with the method specified in JIS K7127.

In the battery packaging material according to the present invention, stresses in the MD direction and the TD direction in the base material layer 1 satisfy the above-mentioned relationship, so that generation of pinholes, cracks and the like during molding is suppressed, and thus the battery packaging material has excellent moldability. The detailed mechanism in which when the properties of the base material layer 1 that forms the outer layer in the battery packaging material according to the present invention are set in the manner described above, generation of pinholes, cracks and the like during molding is suppressed is not all evident, but may be considered as follows, for example. The values A and B of the ratio of a stress in elongation by 50% to a stress in elongation by 5% in the MD direction and the TD direction are large enough to satisfy the relationship of A+B≥3.5. Accordingly, for example as shown by the line A in FIG. 3, i.e. a schematic view showing a relationship between stress and strain during molding of the battery packaging material, a change in stress around the yield point in a stress-strain curve is gentle, and therefore deformation (extension) of the metal layer 3 laminated to the base material layer 1 with the adhesive layer 2 interposed therebetween can be gently changed. Accordingly, it is considered that during molding of the battery packaging material, the metal layer 3 can be made to properly follow the shape of a mold, so that generation of pinholes, cracks and the like is suppressed.

Figure 3:
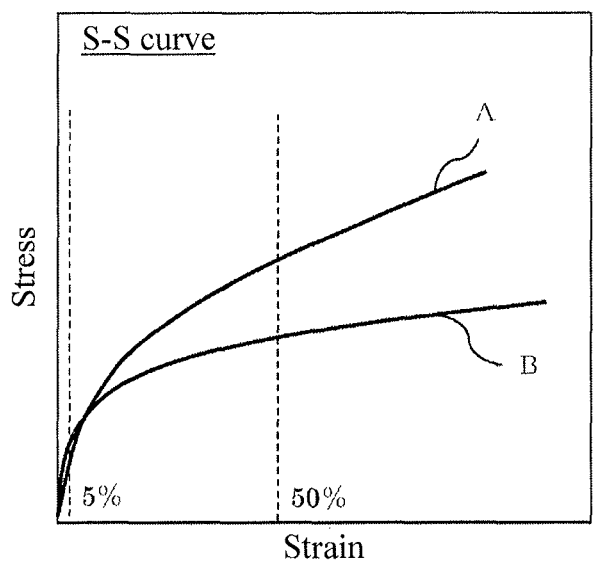
FIG. 3 is a schematic view for explaining a relationship between stress and strain during molding of a battery packaging material.

On the other hand, when the value of A+B is less than 3.5 in the base material layer 1, a change in stress around the yield point in the stress-strain curve is large as shown by the line B in FIG. 3, and therefore deformation (extension) of the metal layer 3 laminated to the base material layer with the adhesive layer interposed therebetween is greatly changed. Accordingly, it is considered that during molding of the battery packaging material, the metal layer 3 is hardly made to properly follow the shape of a mold, so that pinholes, cracks and the like are easily generated.

For suppressing pinholes, cracks and the like during molding of the battery packaging material to further improve moldability, the base material layer 1 preferably satisfies the relationship of A+B≥3.9, further preferably satisfies A+B≥4.1. Further, from the same point of view, it is preferable that the value A and the value B satisfy the relationship of A<B. From the same point of view it is preferable that the value A is 1.5 or more, and the value B is 2.0 or more, and it is more preferable that the value A is 1.8 or more, and the value B is 2.3 or more. In the present invention, the upper limit of the value of A+B is not particularly limited, but normally the value of A+B is about 10.0 or less. The upper limit of the value A and the upper limit of the value B are not particularly limited, but normally the value A is about 4.5 or less, and the value B is about 5.5 or less.

The stress in elongation by 50% in the MD direction in the base material layer 1 is not particularly limited, but it is preferably about 100 to 210 MPa, more preferably about 110 to 200 MPa. The stress in elongation by 50% in the TD direction in the base material layer 1 is not particularly limited, but it is preferably about 130 to 270 MPa, more preferably about 140 to 260 MPa. The stress in elongation by 5% in the MD direction in the base material layer 1 is not particularly limited, but it is preferably about 50 to 110 MPa, more preferably about 60 to 100 MPa. The stress in elongation by 5% in the TD direction in the base material layer 1 is not particularly limited, but it is preferably about 40 to 100 MPa, more preferably about 50 to 90 MPa.

The material that forms the base material layer 1 is not particularly limited as long as it has an insulation quality, and satisfies the above-mentioned relationship. Examples of the material that forms the base material layer 1 include resins films of polyester resin, polyamide resin, epoxy resin, acrylic resin, fluororesin, polyurethane resin, silicone resin, phenol resin and mixtures and copolymers thereof. Among them, polyester resins and polyamide resins are preferred, and biaxially stretched polyester resins and biaxially stretched polyamide resins are more preferred. Specific examples of the polyester resin include polyethylene terephthalate, polybutylene terephthalate, polyethylene naphthalate, polybutylene naphthalate, copolymerized polyester and polycarbonate. Specific examples of the polyamide resin include nylon 6, nylon 6,6, copolymers of nylon 6 and nylon 6,6, nylon 6,10 and polymethaxylylene adipamide (MXD6).

The tensile rupture strength of the base material layer 1 (resin film that forms the base material layer 1) in the MD direction is preferably 190 to 350 MPa, more preferably 210 to 320 MPa. The tensile rupture strength of the base material layer 1 in the TD direction is preferably 220 to 400 MPa, more preferably 260 to 350 MPa. When the tensile rupture strength of the base material layer 1 is in a range as described above, generation of pinholes and cracks during molding of the battery packaging material according to the present invention can be further effectively suppressed to further improve moldability. The tensile rupture strength of the base material layer 1 is a value obtained by performing measurement using a method conforming to JIS K7127.

The tensile rupture elongation of the base material layer 1 in the MD direction is preferably 80 to 150%, more preferably 90 to 130%. The tensile rupture elongation of the base material layer 1 in the TD direction is preferably 70 to 150%, more preferably 80 to 120%. When the tensile rupture elongation of the base material layer 1 is in a range as described above, generation of pinholes and cracks during molding of the battery packaging material according to the present invention can be further effectively suppressed to further improve moldability. The tensile rupture elongation of the base material layer 1 is a value obtained by performing measurement using a method conforming to JIS K7127.

The base material layer 1 may be formed of a single layer resin film, or may be formed of a resin film having two or more layers for improving pinhole resistance and an insulation quality. When the base material layer 1 is formed of a multilayer resin film, two or more resin films may be laminated together with an adhesive component such as an adhesive agent or an adhesive resin interposed therebetween, and the kind, amount and so on of the adhesive component to be used are similar to those for the later-described adhesive layer 2 or adhesive layer 5. The method for laminating a resin film having two or more layers is not particularly limited, and a known method can be employed. Examples thereof include a dry lamination method and a sand lamination method, and a dry lamination method is preferred. When the resin film is laminated by a dry lamination method, it is preferred to use a urethane-based adhesive agent as the adhesive layer. Here, the thickness of the adhesive layer is, for example, about 2 to 5 μm.

The thickness of the base material layer 1 is not particularly limited as long as the above-mentioned properties are obtained, and it is, for example, about 10 to 50 μm, preferably about 15 to 25 μm.

[Adhesive Layer 2]

In the battery packaging material according to the present invention, the adhesive layer 2 is a layer provided between the base material layer 1 and the metal layer 3 for strongly bonding these layers to each other.

The adhesive layer 2 is formed from an adhesive agent capable of bonding the base material layer 1 and the metal layer 3. The adhesive agent used for forming the adhesive layer 2 may be a two-liquid curable adhesive agent, or may be a one-liquid curable adhesive agent. Further, the bonding mechanism of the adhesive agent used for forming the adhesive layer 2 is not particularly limited, and may be any one of a chemical reaction type, a solvent volatilization type, a heat melting type, a heat pressing type and so on.

Specific examples of the adhesive component that can be used for forming the adhesive layer 2 include polyester-based resins such as polyethylene terephthalate, polybutylene terephthalate, polyethylene naphthalate, polybutylene naphthalate, polyethylene isophthalate, polycarbonate and copolymerized polyester; polyether-based adhesives; polyurethane-based adhesives; epoxy-based resins; phenol resin-based resins; polyamide-based resins such as nylon 6, nylon 66, nylon 12 and copolymerized polyamide; polyolefin-based resins such as polyolefins, carboxylic acid-modified polyolefins and metal-modified polyolefins, polyvinyl acetate-based resins; cellulose-based adhesive agents; (meth)acryl-based resins; polyimide-based resins; amino resins such as urea resins and melamine resins; rubbers such as chloroprene rubber, nitrile rubber and styrene-butadiene rubber; and silicone-based resins. These adhesive components may be used alone, or may be used in combination of two or more thereof. Among these adhesive components, polyurethane-based adhesives are preferred.

The thickness of the adhesive layer 2 is, for example, about 1 to 10 μm, preferably about 2 to 5 μm.

[Metal Layer 3]

In the battery packaging material, the metal layer 3 is a layer that is intended to improve the strength of the battery packaging material, and also functions as a barrier layer for preventing ingress of water vapor, oxygen, light and the like into the battery. Specific examples of the metal forming the metal layer 3 include aluminum, stainless and titanium, with aluminum being preferred. The metal layer 3 can be formed from a metal foil or by metal deposition, and is preferably formed from a metal foil, more preferably from an aluminum foil. From the point of view of preventing generation of wrinkles, pinholes and the like in the metal layer 3 during production of the battery packaging material, it is more preferred that the metal layer 3 is formed from a soft aluminum foil such as annealed aluminum (JIS A8021P-O, JIS A8079P-O).

While the thickness of the metal layer 3 is not particularly limited, it can be, for example, about 10 μm to 50 μm, preferably about 20 μm to 40 μm.

Preferably, at least one surface, preferably both surfaces, of the metal layer 3 is subjected to a chemical conversion treatment for stabilization of bonding, prevention of dissolution and corrosion, and so on. Here, the chemical conversion treatment is a treatment for forming an acid resistance film on the surface of the metal layer. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer having repeating units represented by the following general formulae (1) to (4). In the aminated phenol polymer, the repeating units represented by the following general formulae (1) to (4) may be contained alone, or may be contained in combination of two or more thereof.

[Chemical Formula 1]

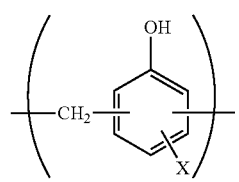

(1)

[Chemical Formula 2]

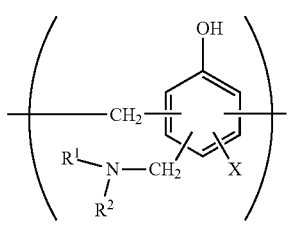

(2)

[Chemical Formula 3]

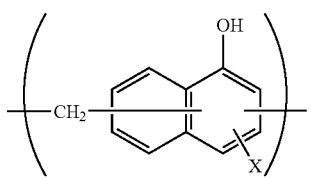

(3)

-continued

[Chemical Formula 4]

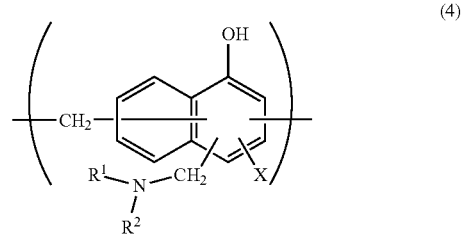

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups with a carbon number of 1 to 4, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), the alkyl group and the hydroxyalkyl group represented by X, $R^1$ and $R^2$ may be the same or different. In the general formulae (1) to (4), X is preferably a hydrogen atom, a hydroxyl group, or a hydroxyalkyl group. A number average molecular weight of the aminated phenol polymer having repeating units represented by the general formulae (1) to (4) is preferably about 500 to 1000000, and more preferably about 1000 to 20000, for example.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form corrosion resistance treatment layer on the surface of the metal layer 3. A resin layer with a cationic polymer crosslinked with a crosslinking agent may be further formed on the corrosion resistance treatment layer. Here, examples of the cationic polymer include polyethyleneimine, ion polymer complexes formed of a polymer having polyethyleneimine and a carboxylic acid, primary amine-grafted acrylic resins obtained by graft-polymerizing a primary amine with an acrylic main backbone, polyallylamine or derivatives thereof, and aminophenols. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

As for the chemical conversion treatment, only one chemical conversion treatment may be conducted, or combination of two or more chemical conversion treatments may be conducted. The chemical conversion treatments may be performed using one compound alone, or may be performed using two or more compounds in combination. Among chemical conversion treatments, a chromic acid chromate treatment, a chromate treatment using a chromic acid compound, a phosphoric acid compound and an aminated phenol polymer in combination, and so on are preferred.

The amount of the acid resistance film to be formed on the surface of the metal layer 3 in the chemical conversion treatment is not particularly limited, but for example, when the above-mentioned chromate treatment is performed, it is desirable that the chromic acid compound be contained in an amount of about 0.5 mg to about 50 mg, preferably about 1.0 mg to about 40 mg, in terms of chromium, the phosphorus compound be contained in an amount of about 0.5 mg to about 50 mg, preferably about 1.0 mg to about 40 mg, in terms of phosphorus, and the aminated phenol polymer be contained in an amount of about 1 mg to 200 mg, preferably about 5.0 mg to 150 mg, per 1 $m^2$ of the surface of the metal layer 3.

The chemical conversion treatment is performed in the following manner: a solution containing a compound to be used for formation of an acid resistance film is applied onto the surface of the metal layer by a bar coating method, a roll coating method, a gravure coating method, an immersion method or the like, and heating is then performed so that the temperature of the metal layer is about 70° C. to 200° C. The metal layer may be subjected to a degreasing treatment by an alkali immersion method, an electrolytic cleaning method, an acid cleaning method, an electrolytic acid cleaning method or the like before the metal layer is subjected to a chemical conversion treatment. When a degreasing treatment is performed as described above, the chemical conversion treatment of the surface of the metal layer can be further efficiently performed.

[Sealant Layer 4]

In the battery packaging material according to the present invention, the sealant layer 4 corresponds to the innermost layer, and during assembling a battery, the sealant layer is heat-welded with itself to hermetically seal the battery element.

The resin component to be used in the sealant layer 4 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); and terpolymers of ethylene-butene-propylene. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, carboxylic acid-modified polyolefins are preferred, and carboxylic acid-modified polypropylene is further preferred.

The sealant layer 4 may be formed from one resin component alone, or may be formed from a blend polymer obtained by combining two or more resin components. Further, the sealant layer 4 may be formed of only one layer, but may be formed of two or more layers with the same resin component or different resin components.

The thickness of the sealant layer 4 may be appropriately selected, and it is, for example, about 10 to 100 μm, preferably about 15 to 50 μm.

[Adhesive Layer 5]

In the battery packaging material according to the present invention, the adhesive layer 5 is a layer that is provided between the metal layer 3 and the sealant layer 4 as necessary for strongly bonding these layers to each other.

The adhesive layer 5 is formed from an adhesive agent capable of bonding the metal layer 3 and the sealant layer 4 to each other. The bonding mechanism, the kind of the adhesive agent component, and so on for the adhesive agent to be used for formation of the adhesive layer 5 are similar to those for the adhesive layer 2. The adhesive agent component to be used in the adhesive layer 5 is preferably a polyolefin-based resin, further preferably a carboxylic acid-modified polyolefin, especially preferably carboxylic acid-modified polypropylene.

The thickness of the adhesive layer 5 is, for example, 2 to 50 μm, preferably 15 to 30 μm.

3. Method for Producing Battery Packaging Material

While the method for producing the battery packaging material according to the present invention is not particularly limited as long as a laminate in which layers each having a predetermined composition are laminated is obtained, for example the following method is shown as an example.

First, a laminate in which the base material layer 1, the adhesive layer 2 and the metal layer 3 are laminated in this order (hereinafter, the laminate may be described as a "laminate A") is formed. Specifically, the laminate A can be formed by a dry lamination method in which an adhesive agent to be used for formation of the adhesive layer 2 is applied onto the base material layer 1 or the metal layer 3 the surface of which is subjected to a chemical conversion treatment as necessary, using a coating method such as an extrusion method, a gravure coating method or a roll coating method, and dried, the metal layer 3 or the base material layer 1 is then laminated, and the adhesive layer 2 is cured.

Then, the sealant layer 4 is laminated on the metal layer 3 of the laminate A. When the sealant layer 4 is laminated directly on the metal layer 3, a resin component that forms the sealant layer 4 may be applied onto the metal layer 3 of the laminate A by a method such as a gravure coating method or a roll coating method. When the adhesive layer 5 is provided between the metal layer 3 and the sealant layer 4, mentioned is provided, for example, by (1) a method in which the adhesive layer 5 and the sealant layer 4 are co-extruded to be laminated on the metal layer 3 of the laminate A (co-extrusion lamination method); (2) a method in which the adhesive layer 5 and the sealant layer 4 are laminated to form a laminate separately, and the laminate is laminated on the metal layer 3 of the laminate A by a thermal lamination method; (3) a method in which an adhesive agent for formation of the adhesive layer 5 is laminated on the metal layer 3 of the laminate A by an extrusion method or a method in which the adhesive agent is applied by solution coating, dried at a high temperature and baked, and the sealant layer 4 formed in a sheet shape beforehand is laminated on the adhesive layer 5 by a thermal lamination method; and (4) a method in which the melted adhesive layer 5 is poured between the metal layer 3 of the laminate A and the sealant layer 4 formed in a sheet shape beforehand, and simultaneously the laminate A and the sealant layer 4 are bonded together with the adhesive layer 5 interposed therebetween (sandwich lamination method).

A laminate including the base material layer 1, the adhesive layer 2, the metal layer 3 the surface of which is subjected to a chemical conversion treatment as necessary, the adhesive layer 5 provided as necessary and the sealant layer 4 is formed in the manner described above, and the laminate may be further subjected to a heating treatment such as that of a heat roll contact type, hot air type or near- or far-infrared ray type, for enhancing the adhesiveness of the adhesive layer 2, and the adhesive layer 5 provided as necessary. As conditions for such a heating treatment, for example, the temperature is 150 to 250° C., and the time is 1 to 5 minutes.

In the battery packaging material according to the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

4. Use of Battery Packaging Material

The battery packaging material according to the present invention is used as a packaging material for hermetically sealing and storing battery elements such as a positive electrode, a negative electrode and an electrolyte.

Specifically, a battery element including at least a positive electrode, a negative electrode and an electrolyte is covered with the battery packaging material according to the present invention such that a flange portion (region where a sealant layer is in contact with itself) can be formed on the periphery of the battery element while a metal terminal connected to each of the positive electrode and the negative electrode protrudes to the outside, and the sealant layer at the flange portion is heat-sealed with itself, thereby providing a battery using a battery packaging material. When the battery element is stored using the battery packaging material according to the present invention, the battery packaging material according to the present invention is used such that the sealant portion is on the inner side (surface in contact with the battery element).

The battery packaging material according to the present invention may be used for either a primary battery or a secondary battery, but is preferably used for a secondary battery. The type of the secondary battery to which the battery packaging material according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material according to the present invention is applied include lithium ion batteries and lithium ion polymer batteries.

EXAMPLES

The present invention will be described in detail below by showing examples and comparative examples. It is to be noted that the present invention is not limited to the examples.

Examples 1 to 4 and Comparative Examples 1 and 2

<Production of Battery Packaging Material>

A battery packaging material including a laminate with a base material layer 1, an adhesive layer 2, a metal layer 3, an adhesive layer 5 and a sealant layer 4 laminated in this order was produced by laminating the adhesive layer 5 and the sealant layer 4 by a thermal lamination method to a laminate with the base material layer 1, the adhesive layer 2 and the metal layer 3 laminated in this order. Specific conditions for producing the battery packaging material are as shown below.

As resin films for forming the base material layer 1, a biaxially stretched nylon film, a biaxially stretched polyethylene terephthalate film and a biaxially stretched polybutylene terephthalate film, each having a value A=a ratio of a stress in elongation by 50% to a stress in elongation by 5% in the MD direction and a value B=a ratio of a stress in elongation by 50% to a stress in elongation by 5% in the TD direction as described in Table 1. The stress in elongation by 50% and the stress in elongation by 5% in the MD direction and the TD direction, the tensile rupture strength and the tensile rupture elongation in the resin film are values each measured in accordance with a method as specified in JIS K7127. In Example 3, a laminate with a biaxially stretched polyethylene terephthalate film and a biaxially stretched nylon film laminated with an adhesive layer interposed therebetween was used as the base material layer 1, and the values A and B were measured for this laminate. The laminate was used in such a manner that the biaxially stretched nylon film was situated on the metal layer 3 side.

As an aluminum foil (AL foil) for forming the metal layer 3, a foil (thickness 35 μm) of soft aluminum (JIS H4160 A8021H-O), both surfaces of which were subjected to a chemical conversion treatment, was used. The chemical conversion treatment of the AL foil was performed by applying to both the surfaces of the metal layer a treatment liquid including a phenol resin, a chromium fluoride compound (trivalent) and phosphoric acid using a roll coating method, and performing baking for 20 seconds under such conditions that the film temperature was 180° C. or higher.

First, a laminate with the base material layer 1, the adhesive layer 2 and the metal layer 3 laminated in this order was prepared. Specifically, the adhesive layer 2 composed of a two-liquid urethane adhesive agent including a polyester-based main agent and an isocyanate-based curing agent was formed in a thickness of 3 μm on one surface (coronatreated) of the base material layer 1, and bonded (thermally laminated) to a chemically converted surface of the metal layer 3 by pressurization and heating to prepare a laminate with the base material layer 1, the adhesive layer 2 and the metal layer 3 laminated in this order.

Separately, an acid-modified polypropylene resin [unsaturated carboxylic acid-graft-modified random polypropylene graft-modified with an unsaturated carboxylic acid (hereinafter, referred to as PPa)] for forming the adhesive layer 5 and polypropylene [random copolymer (hereinafter, referred to as PP)] for forming the sealant layer 4 were co-extruded to prepare a two-layer co-extruded film composed of the 20 μm-thick adhesive layer 5 and the 20 μm-thick sealant layer 4.

The prepared two-layer co-extruded film was then superimposed on the prepared laminate including the base material layer 1, the adhesive layer 2 and the metal layer 3 in such a manner that the adhesive layer 5 of the two-layer co-extruded film was in contact with the metal layer of the laminate, and thermal lamination was performed by applying heat so that the temperature of the metal layer 3 was 120° C., thereby obtaining a laminate with the base material layer 1, the adhesive layer 2, the metal layer 3, the adhesive layer 5 and the sealant layer 4 laminated in this order. The obtained laminate was temporarily cooled, then heated to 180° C., and held at this temperature for 1 minute to be heat-treated, thereby a battery packaging material in each of Examples 1 to 4 and Comparative Examples 1 and 2 was obtained.

<Evaluation of Moldability>

The battery packaging material obtained as described above was cut to prepare a strip piece of 120×80 mm, and the strip piece was used as a test sample. A straight mold including a rectangular male mold of 30×50 mm, and a female mold with a clearance of 0.5 mm from the male mold was prepared, the test sample was placed on the female mold in such a manner that the thermally bondable resin layer was situated on the male mold side, the test sample was pressed at a pressing pressure (surface pressure) of 0.1 MPa in such a manner that the molding depth was 6 mm, and cold molding (draw-in one-step molding) was performed. Presence/absence of pinholes and cracks in the metal layer in each of the molded battery packaging materials was checked, and the ratio of generation (%) of pinholes and cracks was calculated. For the ratio of generation of pinholes and cracks, a test sample having at least one pinhole or crack after being molded as described above was discriminated as a molding defective product, and the ratio of molding defective products occurring at the time of molding 30 test samples under the above-mentioned conditions was determined. The results are shown in Table 1.

TABLE 1

| | Base material layer 1 | Tensile rupture strength [MPa] MD | TD | Tensile rupture elongation [%] MD | TD | Stress in elongation by 5% [MPa] MD | TD | Stress in elongation by 50% [MPa] MD | TD | A | B | A + B | Ratio of generation of pinholes and cracks [%] |
|---|---|---|---|---|---|---|---|---|---|---|---|---|---|
| Example 1 | Biaxially stretched nylon film (15 μm) | 286 | 348 | 110 | 85 | 95 | 61 | 195 | 257 | 2.1 | 4.2 | 6.3 | 0 |
| Example 2 | Biaxially stretched polybutylene terephthalate film (12 μm) | 212 | 262 | 128 | 105 | 60 | 53 | 113 | 160 | 1.9 | 3.0 | 4.9 | 0 |
| Example 3 | Biaxially stretched polyethylene terephthalate film (12 μm)/adhesive layer (3 μm)/biaxially stretched nylon (15 μm) | 258 | 303 | 111 | 96 | 96 | 90 | 174 | 210 | 1.8 | 2.3 | 4.1 | 0 |
| Example 4 | Biaxially stretched polybutylene terephthalate film (12 μm) | 191 | 240 | 144 | 107 | 80 | 57 | 116 | 140 | 1.5 | 2.5 | 3.9 | 7 |
| Comparative Example 1 | Biaxially stretched nylon film (15 μm) | 206 | 294 | 110 | 70 | 95 | 105 | 150 | 190 | 1.6 | 1.8 | 3.4 | 55 |
| Comparative Example 2 | Biaxially stretched polyethylene terephthalate film (12 μm) | 222 | 271 | 110 | 92 | 133 | 144 | 133 | 169 | 1.0 | 1.2 | 2.2 | 67 |

A: Stress in elongation by 50%/stress in elongation by 5% in MD direction
B: Stress in elongation by 50%/stress in elongation by 5% in TD direction The results in Table 1 show that even when the battery packaging material was molded under a severe condition, i.e. at a molding depth of 6 mm, the battery packaging materials of Examples 1 to 4 in which the base material layer satisfied the relationship of A+B≥3.5 had no pinholes and cracks, suggesting that generation of pinholes and cracks was remarkably suppressed. The battery packaging materials of Comparative Examples 1 and 2 in which the base material layer satisfied the relationship of A+B<3.5 had a high ratio of generation of pinholes and cracks when molded at a molding depth of 6 mm, and was thus inferior in moldability to the battery packaging materials of Examples 1 to 4.

DESCRIPTION OF REFERENCE SIGNS

1: Base material layer
2: Adhesive layer
3: Metal Layer
4: Sealant layer
5: Adhesive layer

The invention claimed is:

1. A battery packaging material comprising a laminate in which at least a base material layer, an adhesive layer, a metal layer and a sealant layer are laminated in this order, the base material layer satisfying the relationship of A+B≥3.5, where A+B is a sum of a value A of a ratio of a stress in elongation by 50% in the MD direction to a stress in elongation by 5% in the MD direction and a value B of a ratio of a stress in elongation by 50% in the TD direction to a stress in elongation by 5% in the TD direction.

2. The battery packaging material according to claim 1, wherein the value A and the value B satisfy the relationship of A<B.

3. The battery packaging material according to claim 1, wherein the value A is 1.5 or more, and the value B is 2.0 or more.

4. The battery packaging material according to claim 1, wherein the base material layer is formed of at least one of a polyamide resin and a polyester resin.

5. The battery packaging material according to claim 1, wherein at least one surface of the metal layer is subjected to a chemical conversion treatment.

6. The battery packaging material according to claim 1, wherein the metal layer is formed of an aluminum foil.

7. The battery packaging material according to claim 1, which is a packaging material for a secondary battery.

8. A battery comprising a battery element which includes at least a positive electrode, a negative electrode and an electrolyte, the battery element being stored in the battery packaging material according to claim 1.

9. A method to be applied to a battery packaging material, of a laminate in which at least a base material layer, an adhesive layer, a metal layer and a sealant layer are laminated in this order,
the base material layer satisfying the relationship of A+B≥3.5, where A+B is a sum of a value A of a ratio of a stress in elongation by 50% in the MD direction to a stress in elongation by 5% in the MD direction and a value B of a ratio of a stress in elongation by 50% in the TD direction to a stress in elongation by 5% in the TD direction.

10. A method for producing a battery,
the method comprising the step of: storing in a battery packaging material a battery element including at least a positive electrode, a negative electrode and an electrolyte,
the battery packaging material including
a laminate in which at least a base material layer, an adhesive layer, a metal layer and a sealant layer are laminated in this order,
the base material layer satisfying the relationship of A+B≥3.5, where A+B is a sum of a value A of a ratio of a stress in elongation by 50% in the MD direction to a stress in elongation by 5% in the MD direction and a value B of a ratio of a stress in elongation by 50% in the TD direction to a stress in elongation by 5% in the TD direction.

* * * * *